MODULAR CIRCUIT CONSTRUCTION

Filed Nov. 21, 1967

INVENTOR.
JOHN S. DEMETRICK
BY
Wolf, Greenfield & Hieken
ATTORNEYS

United States Patent Office 3,522,485

Patented Aug. 4, 1970

3,522,485

MODULAR CIRCUIT CONSTRUCTION

John De Metrick, Lexington, Mass., assignor to Automatic Radio Manufacturing Co., Inc., Melrose, Mass., a corporation of Massachusetts Filed Nov. 21, 1967, Ser. No. 685,244
Int. Cl. H05k *1/04*
U.S. Cl. 317—101 8 Claims

ABSTRACT OF THE DISCLOSURE

A module board is formed with depending tabs for insertion into mating slots in a main circuit plate. A support plate is secured to the modular circuit board with the plane of the support plate perpendicular to that of the circuit board and formed with a depending tab at right angles to the circuit board tabs for insertion into a mating slot in the main circuit plate. In a preferred form the support plate is made of metal and secured to the circuit board by dip soldering at the time the other components are dip soldered to the circuit board. Preferably, the distance between the support plate depending tab and the circuit board depending tabs is slightly greater than that between the main circuit plate mating slots and the support plate mating slot prior to insertion in the main circuit plate so that the supporting plate tab may be urged toward the circuit board prior to insertion and then released to both mechanically lock the circuit plate into position and establish good electrical contact with the main circuit plate so that the support plate may additionally function as an electrical connection path between the circuit board and the main circuit plate.

BACKGROUND OF THE INVENTION

The present invention relates in general to electronic circuit modules and more particularly concerns a novel circuit module that is relatively easy and inexpensive to initially assemble, easy to insert into a main circuit board to facilitate compact arrangement of components coupled over desired paths with effective isolation over undesired paths and rapid assembly and interconnection on a production basis, while facilitating relatively convenient removal for servicing.

It is an important object of the invention to provide an improved circuit module.

It is another object of the invention to achieve the preceding object while facilitating assembly of each module and attachment to a main circuit plate using structure to effect both mechanical and electrical connection.

It is a further object of the invention to achieve firm mechanical support with means that additionally perform an electrical function.

It is a further object of the invention to achieve the preceding objects while providing relatively high component density.

It is a further object of the invention to achieve the preceding objects while enabling rapid removal and replacement of individual modules when servicing is required.

It is a further object of the invention to achieve the preceding object with a circuit module that is itself relatively easy to service.

SUMMARY OF THE INVENTION

According to the invention, there is a circuit module printed circuit board with components mounted thereon. Means defining a support plate is secured to the module printed circuit board perpendicular thereto. Both the module printed circuit plate and the support plate are formed with depending tabs for engagement with mating slots in a main circuit plate in which the module is to be seated. Preferably the spacing between the support plate tab furthest from the module printed circuit board and the circuit board tabs is slightly greater than that between the support plate slot and the row of module printed circuit board slots in the main circuit plate before the module is inserted so that the module may be inserted by urging that tab closer to the module printed circuit board just prior to insertion. Upon completion of the insertion the row of circuit board tabs and the furthest support plate tab are urged apart to insure a secure mechanical connection to the main circuit plate. At the same time conducting leads associated with the tabs may function to effect desired electrical connections with the circuits on the module printed circuit board.

Numerous features, objects and advantages of the invention will become apparent from the following specification when read in connection with the accompanying drawing in which:

DETAILED DESCRIPTION OF PREFERRED EMBODIMENTS

Figure 1:
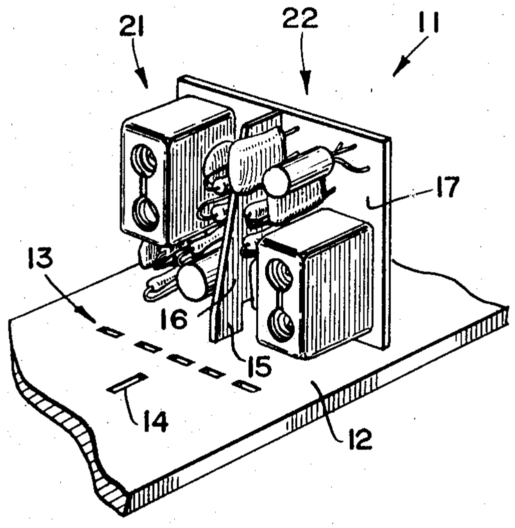
FIG. 1 is a perspective view of an embodiment of the invention positioned on a main circuit plate.

With reference now to the drawing and more particularly FIG. 1 thereof, there is shown an exemplary embodiment of a circuit module 11 seated upon a main circuit plate 12 that is arranged to accept a number of modules like module 11. The main circuit plate 12 includes for each circuit module it is to accommodate an aligned row of printed circuit board slits, such as 13, and a perpendicularly oriented support plate slit, such as 14 for accommodating the depending support plate tab, such as support plate tab 15 on support plate 16 mounted in module printed circuit board 17 and positioned on the component side as shown. In the specific example illustrated support plate 16 is metal and positioned along the midline of the square printed circuit board 17 to divide a left circuit 21 from a right circuit 22 and thus perform an additional electrical function of helping to reduce undesired stray coupling between circuits. Circuits 21 and 22 may, for example, be I-F amplifiers, or an I-F amplifier and detector circuit, or an R-F amplifier and a converter circuit in which stray coupling is not desired. Of course, the circuit board 17 could contain more than two circuits, or less than two circuits, or a part of a circuit and still embody many of the advantages of the invention from one or both of the electrical and mechanical standpoints.

Figure 2:
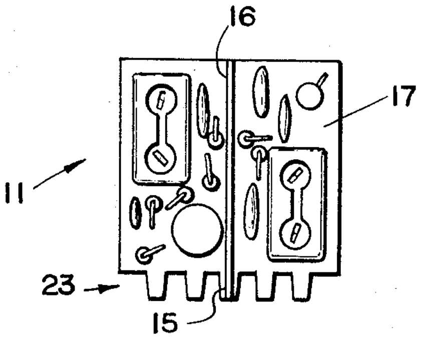
FIG. 2 is a top view of a module according to the invention.
Figure 3:
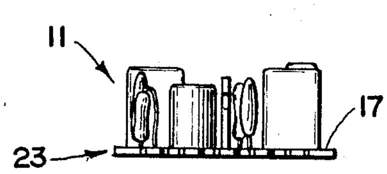
FIG. 3 is a view of the embodiment of FIG. 2 seen from the tab side.

Referring to FIG. 2, there is shown a view of the module 11 of FIG. 1 as seen from the component side. The depending row of five tabs 23 fit in a mating row of slits, such as 13, and main circuit board 12. Referring to FIG. 3, there is shown a view of the circuit module 11 as seen from the tab end.

Figure 4:
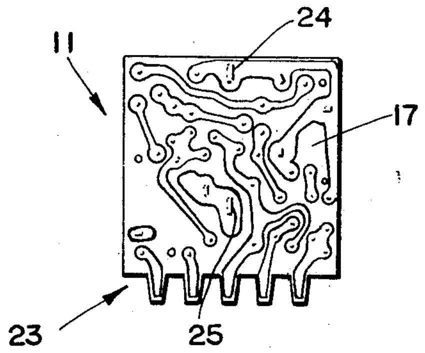
FIG. 4 is a view of the embodiment of FIGS. 2 and 3 as seen from the soldered side.

Referring to FIG. 4, there is shown a view of circuit module 11 as seen from the soldered side. That view shows how support plate module board tabs 24 and 25 seat in mating slots, in the circuit module printed circuit board 17 so that after support plate 16 and all the components are mechanically inserted, the module may be dip soldered to mechanically and electrically secure the components and support plate 16 in position with support plate 16 performing the additional function of providing a conducting path, such as a ground path, to the main circuit plate 12. The view in FIG. 4 also illustrates how conducting portions along the row of tabs 23 may function as leads for interconnecting the circuits on the module with other circuits through the main circuit board 12.

Figure 5:
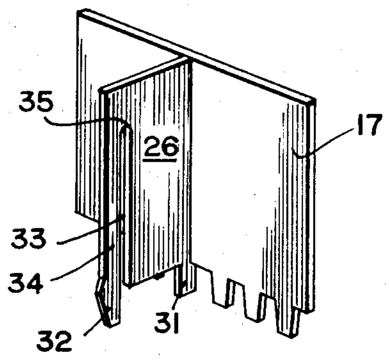
FIG. 5 is a perspective view of an alternate embodiment of the invention using a two-legged support plate.

Referring to FIG. 5, there is shown a perspective view of an alternate form of support plate which may be desirable for certain applications. Support plate 26 has two depending tabs 31 and 32 and includes a lengthwise slot 33 that separates a back leg 34 from the rest of the support plate so that flexing of leg 34 may occur essentially about the pivot point defined by the end 35 of slot 33, thereby permitting more flexure to facilitate insertion.

Figure 6:
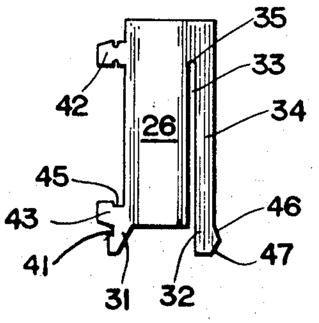
FIG. 6 is a plan view of the two-legged support plate shown in FIG. 5.

Referring to FIG. 6, there is shown a plan view of support plate 26 showing the details of depending tabs 31 and 32. Tab 31 is formed with a notch 41 adapted to engage the main circuit board when inserted. Its upper module circuit board tab 42 slopes down from the top and its lower module circuit board tab 43 slopes up at the bottom. A suitable angle for each of these slopes with the horizontal axis of the order of 15 degrees. Lower tab 43 is also formed with a notch 43 for accommodating module circuit board 17. Upper tab 42 is notched as shown to allow this tab to flex slightly during insertion.

Tab 32 is formed with an upper sloping face 46 that slopes to the right and a lower sloping face 47 that slopes to the left, the angle of slope typically being 15 degrees with the vertical in both cases. The sloping face 47 facilitates insertion while the sloping face 46 helps keep the circuit module securely locked in the main circuit board while facilitating removal when that is desired. It may be desirable to eliminate tab 31 to facilitate both withdrawal and insertion of a circuit module while still retaining the essentials of the invention for securely fastening the circuit module to the main circuit board.

There has been described a novel circuit module and support plate facilitating insertion and withdrawal of circuit modules in the main circuit plate while insuring good mechanical and electrical connections and providing a relatively high component density in a system that is relatively easy and inexpensive to mass produce with high reliability and good repeatability while providing easy access for servicing when necessary. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Modular construction apparatus comprising,
means defining a printed circuit board,
and support plate means generally perpendicular and secured to said printed circuit board,
said printed circuit board and said support plate means being formed with tabs embraced by a common plane for engagement with mating slots in a main circuit plate,
the spacing between the support plate tab furthest from said printed circuit board and the circuit board's tabs being slightly different from that between the mating slot in said main circuit plate for said furthest support plate tab and the row of mating slots in said main circuit plate for said printed circuit board tabs before said apparatus is inserted into said main circuit plate,
and means for yieldably urging said support plate tab and said circuit board tabs to assume said spacing whereby said printed circuit board tabs and said furthest support plate tab may be relatively displaced to assume the distance between said mating slots and said row of mating slots upon insertion of said apparatus into said main circuit plate to establish a secure mechanical connection to said main circuit plate.

2. Modular construction apparatus in accordance with claim 1 and further comprising,
said main circuit plate.

3. Modular construction apparatus in accordance with claim 2 wherein said main circuit plate comprises means for urging said printed circuit board tabs and said furthest support plate tab apart to establish a secure mechanical connection to said main circuit plate.

4. Modular construction apparatus in accordance with claim 3 and further comprising,
conducting material on at least some of said tabs for establishing electrical connection between said printed circuit board and said main circuit plate.

5. Modular construction apparatus in accordance with claim 1 wherein said means defining a support plate is formed of conducting material for helping to shield the portion of said printed circuit board on one side of said support plate from the portion on the other side.

6. Modular construction apparatus in accordance with claim 4 wherein said means defining a support plate is formed of conducting material for helping to shield the portion of said printed circuit board on one side of said support plate from the portion on the other side.

7. Modular construction apparatus in accordance with claim 1 wherein said support plate is formed with a groove that opens at the bottom edge thereof and extends transversely of said lower edge between said support plate tab and said printed circuit board.

8. Modular construction apparatus in accordance with claim 7 wherein said slot is adjacent to said support plate tab and extends for more than half the length of said support plate.

References Cited

UNITED STATES PATENTS

| | | | |
|---|---|---|---|
| 2,876,390 | 3/1959 | Sanders. | |
| 2,894,241 | 7/1959 | McKee. | |
| 2,905,921 | 9/1959 | Barwick. | |
| 2,910,628 | 10/1959 | Keener. | |
| 2,958,013 | 10/1960 | Ansley. | |
| 3,065,383 | 11/1962 | Guillemot. | |
| 3,407,261 | 10/1968 | Donath et al. ___ | 174—68.5 XR |

ROBERT K. SCHAEFER, Primary Examiner

J. R. SCOTT, Assistant Examiner

U.S. Cl. X.R.

174—68.5; 339—17